United States Patent [19]

Handford et al.

[11] Patent Number: 5,633,925
[45] Date of Patent: May 27, 1997

[54] LOW LOSS TELEPHONE CIRCUIT

[75] Inventors: John Handford, Chester; John Nelson, Merseyside, both of United Kingdom

[73] Assignee: GPT Limited, United Kingdom

[21] Appl. No.: 341,576

[22] PCT Filed: May 21, 1993

[86] PCT No.: PCT/GB93/01048

§ 371 Date: Dec. 20, 1994

§ 102(e) Date: Dec. 20, 1994

[87] PCT Pub. No.: WO93/25037

PCT Pub. Date: Dec. 9, 1993

[30] Foreign Application Priority Data

May 22, 1992 [GB] United Kingdom ............ 9211031

[51] Int. Cl.[6] ............................................ H04M 19/08
[52] U.S. Cl. ............ 379/413; 379/398; 379/399; 379/412
[58] Field of Search ....................... 379/413, 398, 379/399, 402, 345, 202, 412

[56] References Cited

U.S. PATENT DOCUMENTS

| | | | |
|---|---|---|---|
| 3,819,951 | 6/1974 | Moore | 307/202 |
| 4,306,119 | 12/1981 | Kutzavitch | 379/398 |
| 5,038,375 | 8/1991 | Sinberg | 379/398 |

FOREIGN PATENT DOCUMENTS

| | | |
|---|---|---|
| 3 244 240 | 3/1984 | Germany . |
| 3244240 | 3/1984 | Germany . |

*Primary Examiner*—Krista M. Zele
*Assistant Examiner*—Jacques M. Saint-Surin
*Attorney, Agent, or Firm*—Kirschstein, et al.

[57] ABSTRACT

A telephone line power strip-off circuit includes a low loss polarity guard sub-circuit, a low loss line seize sub-circuit, a low loss speech transformer sub-circuit and a high efficiency switched mode power supply which has an output voltage less than the input voltage, arranged to recover 80% approximately of the power presented to the terminals of the phone.

8 Claims, 3 Drawing Sheets

LOW LOSS TELEPHONE CIRCUIT

BACKGROUND OF THE INVENTION

This invention relates to a circuit for a telephone line power strip off which is capable of recovering of the order of 80% of the power presented to the terminals of the phone. Switch mode power supply regulators are used to achieve this efficiency along with a re-design of much of the "front end" of the phone.

The amount of power extracted from the line determines the level of features and performance of the phone. Previous products have had to exceed the D.C. voltage requirements (with permission from the Telephone Regulating Authorities). It is unlikely that such permission will be granted in the future and thus it is necessary to produce circuits which extract power from the line efficiently. It is an object of the present invention to produce such a circuit which takes power from the line efficiently and therefore allows the features and performance characteristics of the phone which are currently available, but still meeting the voltage requirements.

SUMMARY OF THE INVENTION

According to the present invention there is provided a telephone circuit including a low loss polarity guard sub-circuit, a low loss line seize sub-circuit, a low loss speech sub-circuit and a switch mode power supply, having an output voltage of less than that of the input voltage.

The polarity guard circuit comprises P and N type MOSFETS connected in an "inverted" mode.

The idea behind the circuit of the invention is to use a method of power extraction to present the maximum amount of power possible from the line to a switch mode power supply (SMPS) in order to achieve efficient delivery of power at the required voltage.

The various sub-circuits in the line current path have been designed to drop only small voltages, allowing the line current to be extracted at a high voltage, without upsetting transmit and receive characteristics. Step down switch-mode regulators may then be used to convert this increased power efficiently to the desired voltage at a current which is greater than that supplied by the line.

BRIEF DESCRIPTION OF THE DRAWINGS

In order that the invention may be readily understood one embodiment thereof will now be described by way of example only, with reference to the accompanying drawings.

In the drawings

DETAILED DESCRIPTION OF THE PREFERRED EMBODIMENT

Figure 1:
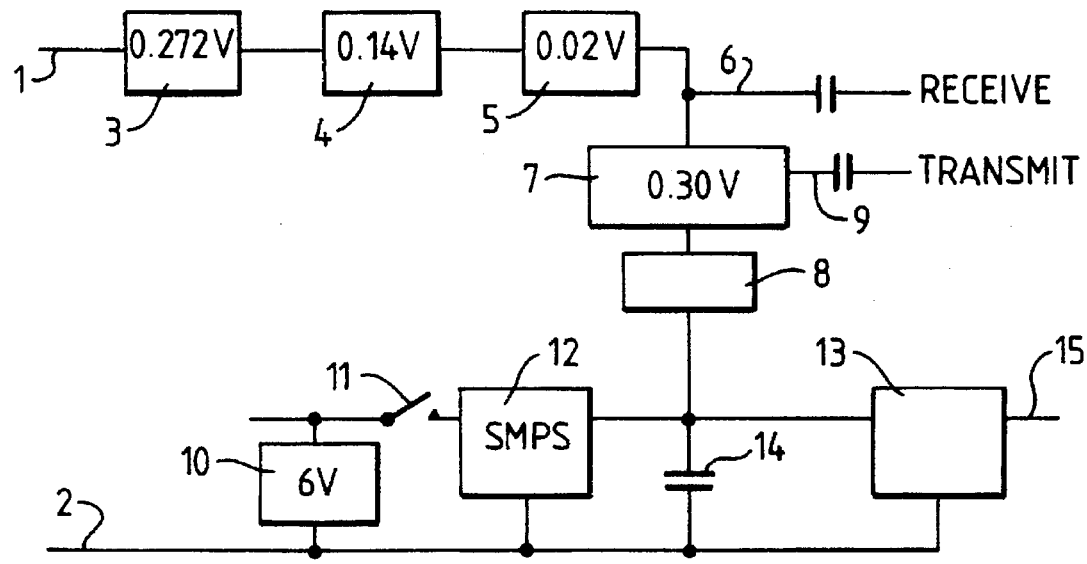
FIG. 1 shows a block diagram of one circuit with an indication of the voltage drops occurring in the various sub-circuits.

Referring first to FIG. 1 where the idea is to present the maximum amount of power possible from the line to a switched mode power supply (SMPS) and to achieve as low a voltage drop over the various sub-circuits as possible. This allows the line current to be extracted at a higher voltage than previously without upsetting transmit and receive characteristics. Step down switch mode regulators can then be used efficiently to convert this increased power to the desired voltage. In FIG. 1 power is supplied to Lines 1 and 2 at a voltage of 8.63 volts at 20 milliamps. The current passes to a line protection sub-circuit 3 and from there to a MOSFET bridge 4 which is a low loss polarity guard circuit and the voltage drop across these sub-circuits is very small. In sub-circuit 3 the drop of 0.272 volts is achieved, across the bridge 4, 0.14 volts, and across the line seize circuit 5, 0.02 volts. Incoming signals pass from the line seize circuit to the receive line 6. The line current passes through an active transformer stage 7, and through a filter 8. Signals to be transmitted from the transmit line 9, are injected through the transformer stage 7. The voltage drop in the transformer stage is only 0.3 volts. From the filter 8, the line current and the voltage available across the capacitor 14, is transferred through an SMPS 13, with an efficiency greater than 90% to the output on line 15, at 5 volts and at a current of 281 milliamps, giving a power output of 141 milliwatts. Any power not used here is transferred through SMPS 12, to a 6 V battery 10, with an efficiency of greater than 90%. The battery is used to supply high current devices such as motors and solenoids, not shown, or to supplement the output 15, during times of peak demand. Thus the output from the circuit is sufficient for all purposes and there is not a substantial voltage drop across the circuit components such as to take the voltage outside the regulations.

Figure 2:
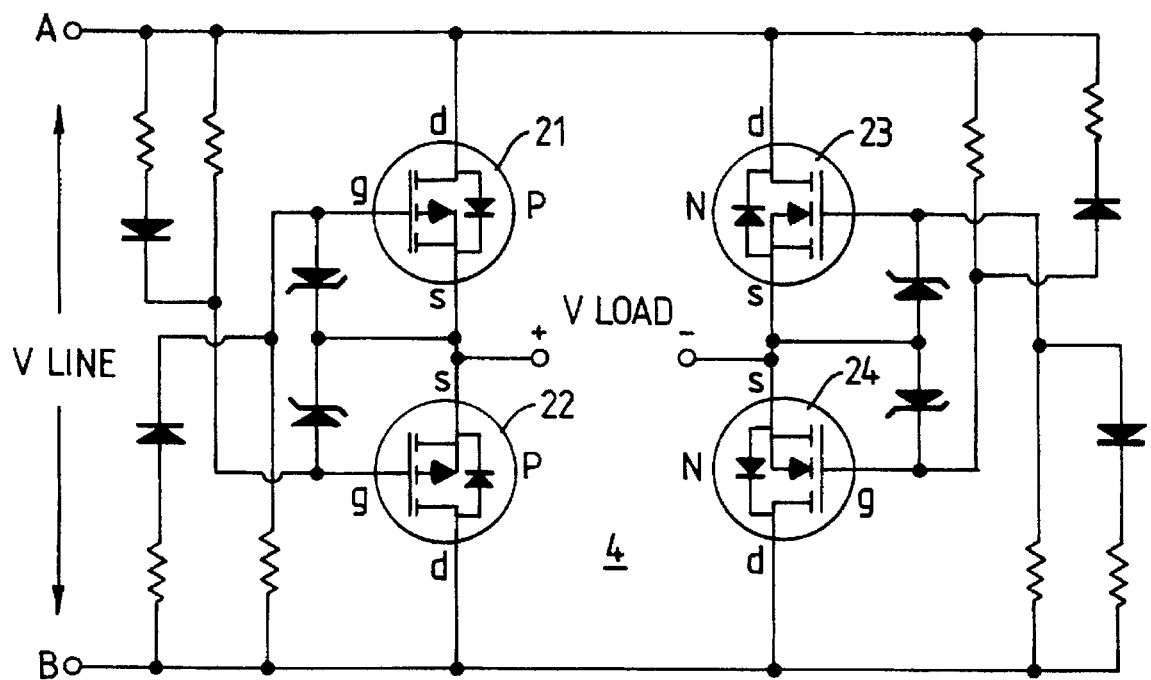
FIG. 2 shows a circuit for a MOSFET bridge.

Referring now to FIG. 2, a MOSFET bridge is shown in which P and N type MOSFETs 21, 22, 23, 24 are used in their inverted mode so that current flows from source to drain in the N type and from drain to source in the P type. The internal diodes behave as a conventional diode bridge when the MOSFET devices are turned off. A telephone line connected to terminals A and B causes only the correct pair of MOSFETs to be turned on due to a biasing arrangement. This allows rectification of the D.C. line current with a very low forward voltage drop when the telephone is off-hook. Ringing voltage present on the line, when the telephone is on-hook, has the effect of turning off the MOSFETs so the ringing signal is unaffected. The zener diodes protect the gates from overvoltage. The remaining diodes and resistors provide the biassing and the ability for charge to be rapidly removed from the gates of the MOSFETS thus allowing them to turn off quickly. This provides a polarity guard function in telephones with very little power/voltage loss as there is in a conventional diode bridge and does not require separate power supply generation as in an all N-type MOSFET bridge.

For the line seize sub-circuit 5 (of FIG. 1) and for the purposes of line strip-off, the only factors of concern are series resistance, leakage current and the fact that a line seize transistor is now being used to pulse the line during dialling. The only resistance is in the MOSFET. The use of the line seize transister for pulse dialling has the advantage that line power is available during dialling and a separate circuit to pulse dial is not required.

The speech circuit is the most difficult to design. Apart from providing the usual speech functions, the circuit must have a minimal volt drop in the line current path and yet be able to give 3.5 volts swing for speech signals. The circuit must also provide a high impedance to incoming signals and work with varying line currents.

Figure 3:
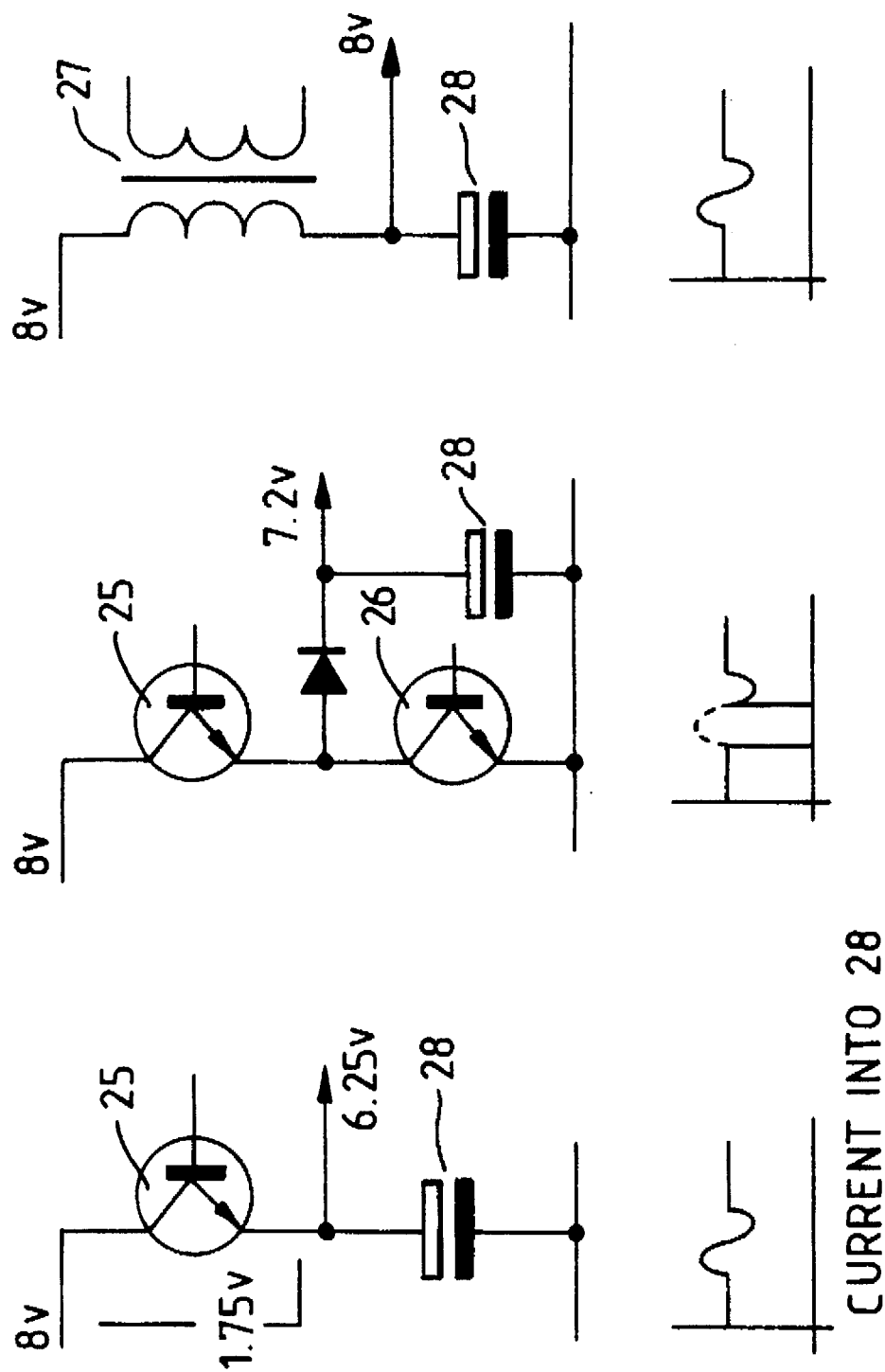
FIGS. 3a, 3b and 3c show alternative approaches for modulating the line current for a speech sub-circuit

Referring now to FIG. 3, the use of a series pass transistor 25 as shown in FIG. 3a is a means of modulating the line current, as used in conventional speech circuits, which causes power loss because of the voltage necessarily dropped across this transistor 25 in order to avoid saturation. An alternative method could be employed as is shown in FIG. 3b, where the series pass transistor 25 only provides the positive half of the speech signal and so runs at saturation for zero signal. When a signal is applied, the negative half of the signal is reproduced by a second transistor 26 which shunts line current to ground. This approach only provides current for the negative half cycle of the signal and less than half current for the positive half cycle. This gives a voltage drop across transistor 25 of 0.8 volts giving an output of 7.2 volts whereas the alternative shown in FIG. 3a causes a drop of 1.7 volts, giving an output of 6.2 volts. However 8 volts can be achieved by the use of a transformer 27, as indicated in FIG. 3c. This transformer 27 has a low D.C. resistance which is therefore able to give a low D.C. voltage drop and the transformer can be used to inject signals to the line.

In all Figures graphs are shown of the current form that goes into the capacitor 28.

The D.C. line current causes the problem of saturation of the magnetic material of the transformer 27. This can be avoided by using a large transformer but unfortunately this pushes the cost up too high and takes up too much space. Transformer 27 must provide a high impedance which would normally involve having a high inductance. This in itself would tend to bring about saturation at even lower line currents.

If the inductance of the transformer is kept low, the number of turns will need to be low, i.e. they will have a low resistance and the saturation problem is thus avoided and the size of the transformer is reduced. The only problem that remains is that of impedance and this can be artificially increased by the use of feedback i.e. if the incoming signal causes a current to flow in the transformer due to the low impedance, this current can be sensed and used to inject a current in the opposite direction, thus cancelled the original current. The original incoming signal now causes no current to flow in the transformer and it looks as if the transformer is presenting a high impedance. If this is coupled up to a conventional but low power speech circuit, the low power loss objectives will be achieved and will still provide a speech circuit that is easy to adjust to any requirement.

Figure 4:
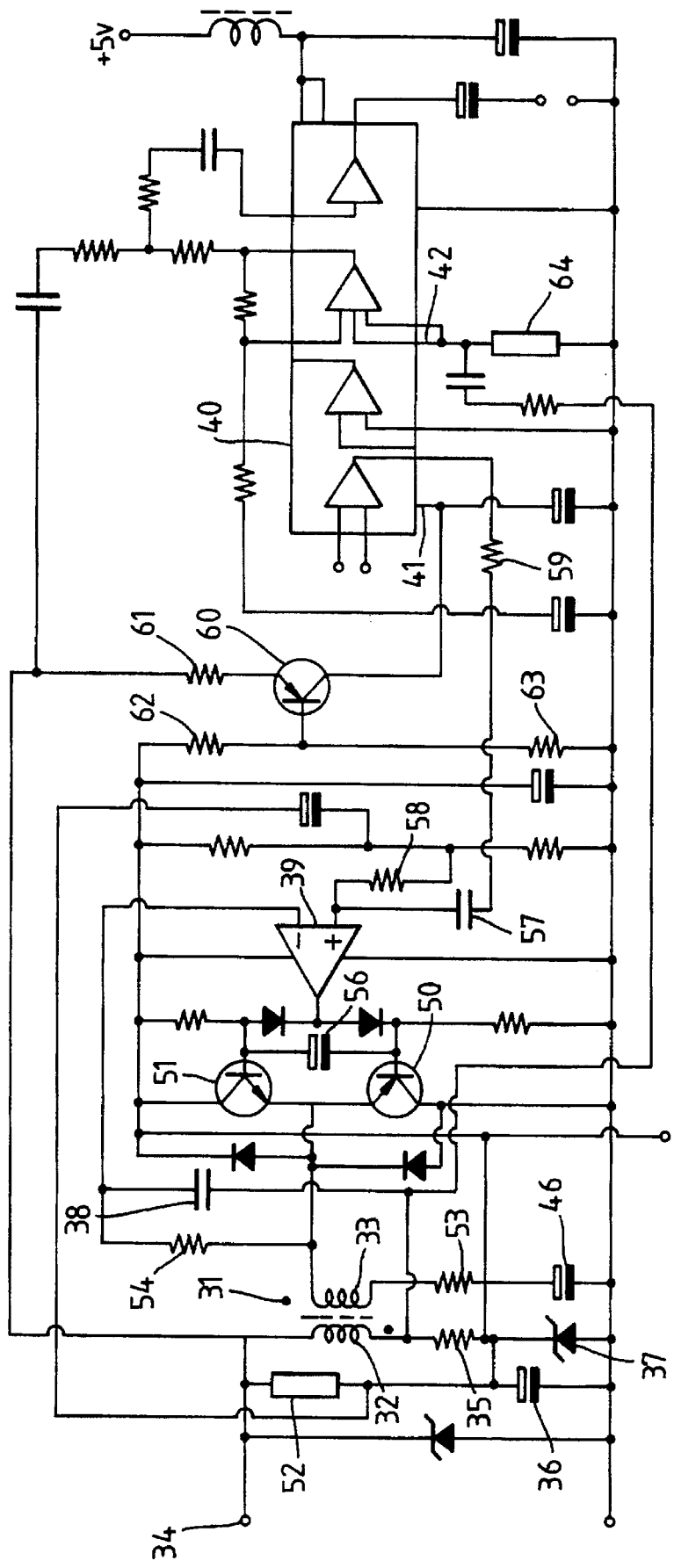
FIG. 4 shows a circuit diagram for a typical speech sub-circuit coupled to the transformer stage of FIG. 3c.

FIG. 4 to which reference is now made represents the complete speech circuit and the active transformer. The transformer allows the D.C. currents through with low power loss. The circuit driving the transformer creates a high impedance to incoming signals from the line whilst a conventional speech chip 40 can drive the transformer driver to send signals out to the line.

A transformer 31 is a low inductance, low D.C. resistance type of small size. Below its primary winding 32 is a current sensing element of low D.C. resistance, 35. Only the A.C. component of the primary current is sensed and amplified by the amplifier 39, 51 & 50. The amplified signal is passed to a secondary winding 33 of the transformer so as to induce in the primary winding 32 a current which equally opposes the original A.C. component of the current. Thus A.C. voltages on the primary winding 32 do not tend to cause current to flow in the primary winding and the transformer appears as a high impedance as if of a much larger size. A.C. signals can be induced into the primary winding 32 by injection into the amplifier. The D.C. current component passes through the primary winding 32 and sensing element 35, with very little power loss as the transformer 31 has very few turns and hence a low D.C. resistance as explained above. Saturation effects in the magnetic material of the transformer due to the D.C. current are minimised because of the low number of turns.

The D.C. current entering at terminal 34 which is the MOSFET bridge positive terminal, flows through winding 32, a resistor 35 and into a reservoir capacitor 36.

The resistor 35 is a sense resistor for the A.C. current flowing through the transformer primary winding 32 as a result of the line signal. The voltage picked up from the top of this resistor is fed back via a capacitor 38 to the negative input of an operational amplifier 39.

The output of the amplifier 39 is fed through a class B booster stage 50, 51 biased to minimise crossover distortion without excess quiescent current. The signal from the class B booster stage 50, 51 feeds the secondary winding 33 of the transformer 31 and induces a current in the primary winding 32, which cancels out the initial current that was sensed at the resistor 35. Thus the high impedance effect is achieved.

An impedance 52 is the impedance that the phone must appear to be, so as to match the line. It is placed in parallel with the transformer primary winding 31 and the resistor 35. As the transformer stage is a high impedance, the impedance 52 will dominate.

The class B stage 50, 51 is needed to boost the output drive of the amplifier 39.

The D.C. bias point of the amplifer 39 is set at half supply and is stabilised by a resistor 54, feeding into the amplifier negative input from the top of the transformer winding 33. This resistor 54 and capacitor 38 form a high pass filter for the AC feedback.

It is important that the positive input of the amplifier 39 is A.C. coupled to the lower side of the resistor 35, in order not to amplify the small voltage variations at the top of the reservoir capacitor 36, as well as the wanted signal. This is done by using a coupling capacitor 56, which ensures that the common mode rejection occurs.

As well as providing a high impedance, the transformer 31 can couple speech signals to the line. The signal coming from the speech chip 40 must couple to the positive input of the amplifier 39 from a microphone amplifier, but not effectively couple this input to ground, otherwise the common mode rejection previously mentioned will be lost. This is achieved by the use of a capacitor 57, a resistor 58 and resistor 59 which is ten times the value of the resistor 58.

A PNP transistor 60 feeds into a Pin 41 of the speech chip 40. This provides enough signal to operate the Automatic Gain Control (AGC). The current produced is fed into Pin 41 where an internal resistor divider chain sets the AGC control voltage.

This method allows easy alteration of the AGC mid point position and range. The network impedance 64 connected to Pin 42 of the chip 40 is the usual side tone balance network required to match mean line impedance.

The use of the high impedance effect of the transformer 31 assists in the power strip-off and makes sure there is sufficient power available to run the phone effectively well within regulations.

We claim:

1. A telephone power strip-off circuit for recovering electrical power from a telephone line, comprising: a polarity guard sub-circuit including a MOSFET bridge operated in an inverted mode, a line seize sub-circuit, a speech transformer sub-circuit, and a switched mode power supply connected in series across said telephone line, said speech transformer sub-circuit including a single, low impedance transformer with a low D.C. resistance primary winding, and a feedback circuit for making the low impedance transformer behave as a high impedance transformer, said feedback circuit being operative for increasing the A.C. impedance of the transformer by sensing flow of a first A.C. current in said primary winding of said transformer and, in response, causing flow of a second A.C. current in said primary winding to cancel the effect of said first current.

2. A circuit according to claim 1, wherein said feedback circuit includes a sense resistor and an operational amplifier, said sense resistor being connected to said primary winding of said transformer and being arranged to feed an A.C. signal from said primary winding to said operational amplifier, said operational amplifier being connected to feed a current to a secondary winding of said transformer and to induce in said primary winding said second current to cancel said first current.

3. A circuit according to claim 2, further including a booster stage amplifier connected between an output of said operational amplifier and said secondary winding of said transformer.

4. A circuit according to claim 3, wherein said sense resistor is A.C. coupled to a non-inverting input of said amplifier.

5. A circuit according to claim 4, further including an impedance connected in parallel with said transformer primary winding and said sense resistor in order to present a required line termination impedance.

6. A circuit according to claim 1, wherein said second A.C. current is induced in said primary winding by applying an A.C. voltage across a secondary winding of said transformer.

7. A circuit according to claim 1, wherein said switched mode power supply has an output voltage less than the input voltage.

8. A circuit according to claim 1, including a reservoir capacitor connected in series with said primary winding of said transformer.

* * * * *